Dec. 24, 1935.  S. P. TSCHAPPAT  2,025,319
COUPLING
Filed Dec. 31, 1934
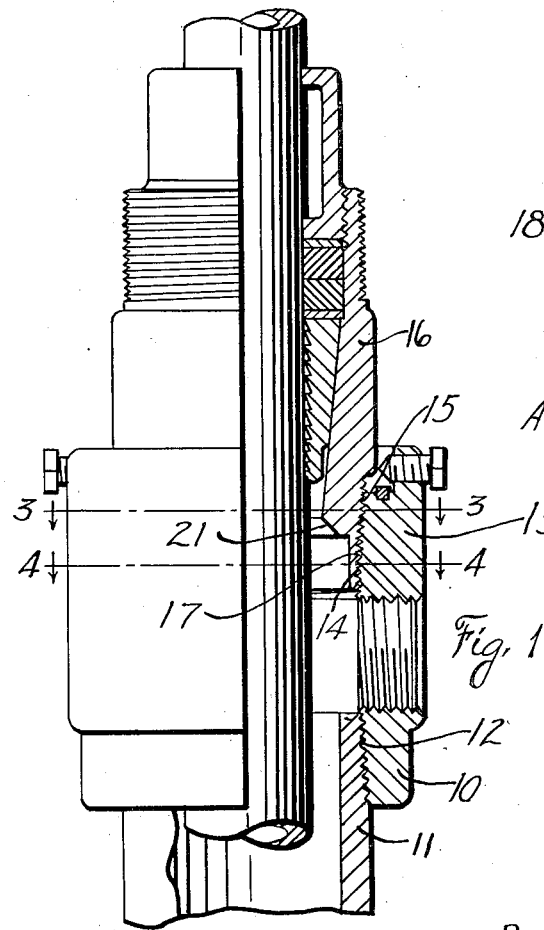
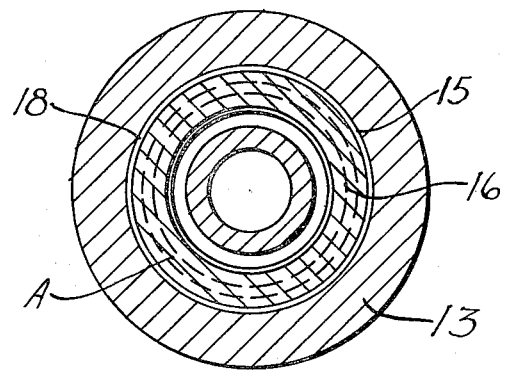
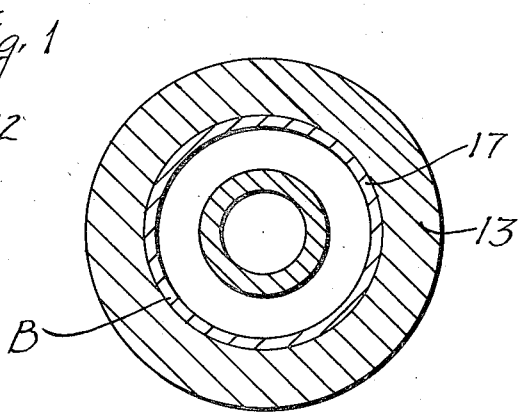
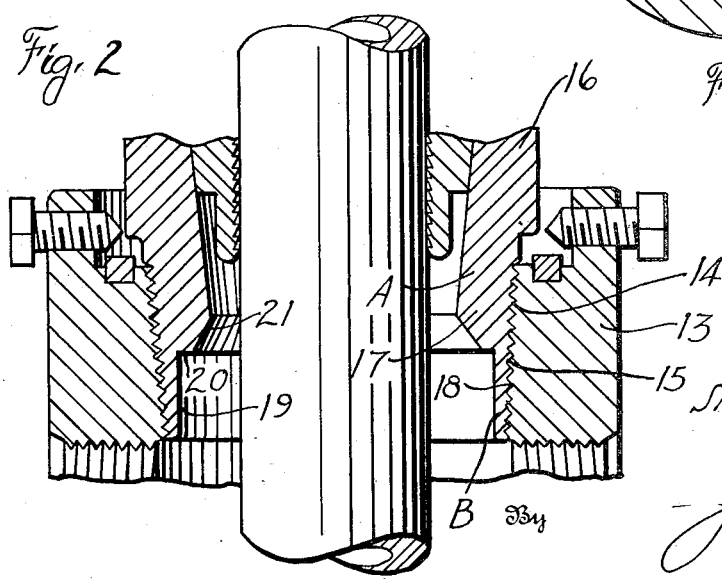
Inventor
Sheridan P. Tschappat
Attorney Patented Dec. 24, 1935

2,025,319

UNITED STATES PATENT OFFICE 2,025,319

COUPLING

Sheridan P. Tschappat, Tulsa, Okla.

Application December 31, 1934, Serial No. 759,923

1 Claim. (Cl. 285—146)

This invention relates to new and useful improvements in couplings.

The invention has particularly to do with screw-threaded connections and the elimination of leaks, whereby a fluid-tight joint is assured, especially under high pressure and without the use of ground joints.

One object of the invention is to provide an improved screw-threaded coupling or connection, which will be fluid-tight under high or low pressures.

Another object of the invention is to provide a screw-threaded coupling of the box and pin type, wherein coarse screw-threads may be employed and an effective fluid seal formed without the use of packing or ground joints.

A particular object of the invention is to provide a coupling in which the end of the pin is made resilient by enlarging the bore to reduce the wall thickness, whereby the pressure of the fluid will expand the end of the pin and increase the frictional contact between the threads of the coupling, thus producing a more effectual seal.

A further object of the invention is to provide an externally screw-threaded pin having a substantial portion of its ends reduced, whereby it is resilient and will expand under internal pressure, while the remainder of the pin resists expansion.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view of a coupling constructed in accordance with the invention, partly in elevation and partly in section, Figure 2 is an enlarged transverse vertical sectional view of the pin and box structure, Figure 3 is a horizontal cross-sectional view taken on the line 3—3 of Figure 1, and Figure 4 is a similar view taken on the line 4—4 of Figure 1.

In the drawing the numeral 10 designates a lower coupling member, such as a casing head. This head or member is usually screwed onto the upper end of a casing 11 and has internal screw-threads 12 at its lower end for this purpose. At its upper end the head is provided with a box 13.

The box is formed with an internally screw-threaded socket or well 14. This well is provided with comparatively coarse threads 15 and is preferably flared upwardly, so as to produce a downward taper. Heads of this construction are in common use.

An upper coupling member or sleeve 16 is provided at its bottom with a pin 17. The pin has external screw-threads 18 for engaging the threads 15. Said pin is also given a downward taper complementary to the taper of the well, so as to form a tight joint when the pin is screwed into the said well.

It will be noted that the wall of the upper portion A of the pin 17 is comparatively thick so as to withstand heavy internal fluid pressures. At its lower end the pin is provided with a counter bore 19, whereby the lower portion or skirt B of the wall of the pin is made comparatively thin. An annular shoulder 20 is provided at the top of the counter bore and a bevel 21 extends from the shoulder to the bore of the pin. The bevel prevents tools catching on the shoulder.

The outer contour or taper of the pin is not disturbed and the end portion B is produced reducing the wall internally. The reduced wall is made so thin as to expand when subjected to the pressure of the fluid flowing through the coupling. This expansion is enhanced by the thickened upper portion A and the shoulder 20. While tapered screw-threaded joints are quite common, it is impossible to prevent them leaking under high pressures, unless ground joints are also provided.

It has been found that a joint constructed in accordance with the invention will not leak under very high fluid pressures. The resiliency of the skirt B is such that the greater the internal fluid pressure, the more said skirt tends to expand, thus increasing the frictional engagement of the lower end of the pin 17 in the box 13. This arrangement forms an effectual fluid-tight seal without the expense of ground joints.

When the internal fluid pressure is relieved the resilient skirt contracts, so that the joint does not "freeze" and the pin may be readily unscrewed. This structure permits the use of coarse threads without leaks and particularly on large diameters. While I have illustrated the invention in connection with a particular type of coupling, the invention may be employed with various articles using a box and pin type of coupling. Also it is not necessary that the well and pin be tapered.

What I claim and desire to secure by Letters Patent, is:

A coupling comprising, a box having an internally screw-threaded well, and an externally screw-threaded pin engaging in the well of said box and having at the lower end of its screw-threaded portion a cup shaped recess the wall thereof being sufficiently reduced to form an elongated resilient skirt for exposure to the pressure of the fluid flowing through the coupling, whereby said skirt is expanded to form a fluid seal with the box.

SHERIDAN P. TSCHAPPAT.